(12) United States Patent
Mathews

(10) Patent No.: US 8,090,869 B2
(45) Date of Patent: Jan. 3, 2012

(54) PRIORITY-BIASED EXIT QUEUE ARBITRATION WITH FAIRNESS

(75) Inventor: Greg Mathews, Santa Clara, CA (US)

(73) Assignee: Alcatel Lucent, Paris (FR)

( * ) Notice: Subject to any disclaimer, the term of this patent is extended or adjusted under 35 U.S.C. 154(b) by 2074 days.

(21) Appl. No.: 10/359,878

(22) Filed: Feb. 7, 2003

(65) Prior Publication Data
US 2003/0225737 A1 Dec. 4, 2003

Related U.S. Application Data

(60) Provisional application No. 60/385,990, filed on Jun. 4, 2002.

(51) Int. Cl.
*G06F 15/173* (2006.01)
(52) U.S. Cl. .................. 709/238; 709/240; 370/412
(58) Field of Classification Search .................. 709/238, 709/240; 370/412; 707/1
See application file for complete search history.

(56) References Cited

U.S. PATENT DOCUMENTS

| 5,517,495 | A | 5/1996 | Lund et al. |
| 5,864,540 | A | 1/1999 | Bonomi et al. |
| 5,905,730 | A | 5/1999 | Yang et al. |
| 6,011,775 | A | 1/2000 | Bonomi et al. |
| 6,295,295 | B1 | 9/2001 | Wicklund |
| 6,487,213 | B1 | 11/2002 | Chao |
| 7,073,005 | B1 * | 7/2006 | Basu et al. ............ 710/240 |
| 2002/0087723 | A1 * | 7/2002 | Williams et al. ........ 709/240 |
| 2002/0089977 | A1 | 7/2002 | Chang et al. |
| 2003/0016686 | A1 * | 1/2003 | Wynne et al. .......... 370/412 |

* cited by examiner

*Primary Examiner* — Kyung H Shin
(74) *Attorney, Agent, or Firm* — Wilson, Ham & Holman

(57) ABSTRACT

Priority-biased compound arbitration at a switching fabric ingress. The ingress includes a plurality of ingress queues and a priority-biased arbitration engine configured to arbitrate between the ingress queues. The ingress further includes exit first-in-first-out queues (FIFOs) configured to forward cells from the ingress queues to a switching fabric and a throughput-biased arbitration engine configured to arbitrate between the exit FIFOs.

27 Claims, 17 Drawing Sheets

900D

PRIORITY-BIASED EXIT QUEUE ARBITRATION WITH FAIRNESS

CROSS REFERENCE TO RELATED APPLICATION

This application is entitled to the benefit of provisional Patent Application Ser. No. 60/385,990, filed Jun. 4, 2002.

FIELD OF THE INVENTION

The present invention relates generally to cell-based traffic arbitration, and more particularly to arbitration to maximize fabric throughput while providing priority biasing.

BACKGROUND OF THE INVENTION

A good switch arbitration algorithm is an important component of any high-speed switch, router, bridge, or other switching device. The objective of maintaining a high throughput while maintaining certain fairness standards makes the switch arbitration problem a nontrivial one. While a number of approaches have been proposed, it is still a fairly open problem with an ongoing quest for satisfactory solutions.

A typical switch includes ingress, a switching fabric, and an egress. Network traffic arrives at the ingress and is forwarded through the switching fabric to the egress. In high-speed routers the most common switch architecture is a crossbar. In crossbar switch ingresses there may be a number of cells targeting the same egress.

There are two key measures of the performance of a switch scheduler. First is throughput, which is a measure of egress channel utilization efficacy. A scheme that leads to egress ports sitting idle at times is clearly not a good scheme. The other measure of performance is fairness. Each incoming flow should get a fair chance to send and not be starved, but when flows are of different priorities they should be forwarded accordingly. The problem then becomes even more complicated.

Coming up with an algorithm that maximizes performance with respect to throughput, fairness, and priority is a very difficult task. The problem grows even more difficult with the increased complexity and number of ports in modern switches. Crossbar size increases quadratically with the number of ports. As complexity increases, computation time decreases. While there may be good algorithms for arbitration, a solution that can be implemented quickly is of greatest importance. In the absence of such a solution, switch arbitration could become a performance-degrading bottleneck.

The switch arbitration problem is the problem of matching incoming cells to egresses. Each cell targets an egress, based upon its destination. (Unicast cells typically target one egress, but multicast cells may target multiple egresses). In the simplest case, incoming cells are stored in a first-in-first-out (FIFO) queue at the ingress. However, when a cell at the head of the queue targets an egress that is busy, the cell will block all other cells in the queue from being forwarded. For example, a cell that targets a free egress will not be transferred if it is not on top of the FIFO queue. This is referred to as head-of-line (HOL) blocking. To solve the HOL blocking, each cell at the ingress could be stored in a different buffer. This improves performance but makes the problem significantly more complicated, essentially a complicated bi-partite graph matching problem.

Additional complexity comes from, for example, setting priorities for certain queues or making quality of service (QoS) guarantees. In some cases, different scheduling algorithms may be selected for use with different subsets of queues. The two most popular scheduling algorithms are strict priority and weighted fair queuing (WFQ). With strict priority, cells are forwarded from higher priority queues first. This algorithm is relatively straightforward to implement. However, a strict priority policy may allow higher priority traffic to completely starve lower priority traffic. With WFQ, the scheduler applies a weight to each queue and then uses a round robin algorithm tempered by the weights. Weights are generally assigned relative to the proportion of bandwidth allocated for each queue. WFQ algorithms are more difficult to implement than strict priority, but are used anyway because of the desire to avoid starving lower priority traffic. However, many of these algorithms, such as longest queue first (LQF), become excessively difficult and costly to implement in high-speed switches. Though not as popular, it should be noted that round robin algorithms work just as well as weighted algorithms when traffic has a uniform pattern. However, if traffic is non-uniform, some ingresses might be loaded more than others, making round robin unfair in some cases. Strict priority and WFQ are often combined in a two-level scheme so that highest priority traffic is sent first in accordance with strict priority, and lower priority traffic is sent according to the WFQ algorithm. However, this introduces dependencies that undermine the quality of the solution. Accordingly, the search continues for improved arbitration algorithms.

Due to the difficulty in implementing an arbitration algorithm with a balance of fairness and throughput, as well as a priority bias, a new priority-biased arbitration that maximizes throughput while maintaining fairness is desirable. The algorithm should be practical for implementation in a high-speed switch and sufficiently simple that the switch does not become a network bottleneck. Preferably, the implementation is scalable to larger, more complex switches.

SUMMARY OF THE INVENTION

A technique for traffic forwarding involves performing compound arbitration at an ingress. The compound arbitration includes a first priority-biased arbitration stage and a second throughput-biased arbitration stage. By performing the arbitration in stages, system complexity is reduced sufficiently to allow arbitration with a priority-bias without eliminating fairness.

In an embodiment, a method of compound arbitration includes determining which cells are to be forwarded from ingress queues to exit first-in-first-out queues (FIFOs) in accordance with a priority-biased arbitration stage and determining which cells are to be forwarded from the exit FIFOs to a switch fabric in accordance with a throughput-biased arbitration stage.

In another embodiment, a system for performing compound arbitration includes ingress queues, a priority-biased arbitration engine configured to arbitrate between the ingress queues, exit FIFOs configured to forward cells from the ingress queues to a switching fabric, and a throughput-biased arbitration engine configured to arbitrate between the exit FIFOs.

In another embodiment, a system for forwarding traffic includes a fabric ingress, a fabric egress, a switching fabric coupled to the fabric ingress and the fabric egress, and a network processor configured to facilitate the forwarding of cells from a first media module through the fabric ingress, through the switching fabric, and through the fabric egress, to a second media module by performing a compound arbitration prior to forwarding to the switching fabric, wherein the compound arbitration includes a priority-biased arbitration and a throughput-biased arbitration.

Using the above-described techniques, arbitration at a switching fabric ingress is achieved with a priority bias and fairness.

Exemplary figures illustrate embodiments of the invention. Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
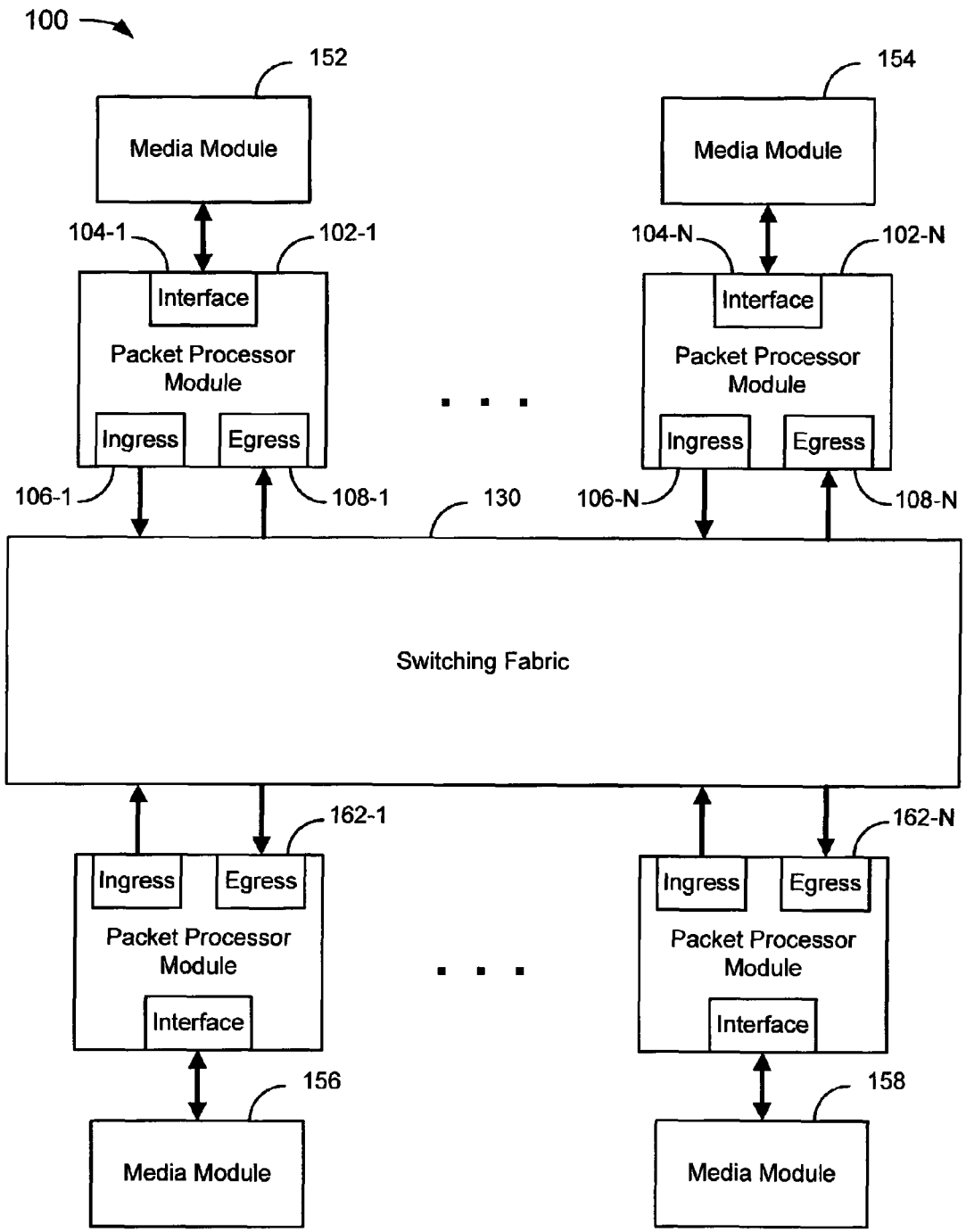
FIG. 1 is a block diagram of a traffic forwarding system in accordance with an embodiment of the invention.

As shown in the drawings for the purposes of illustration, an embodiment of the invention is a traffic forwarding system configured for use in a network with cell-based traffic. The system includes an ingress to a switching fabric. The ingress performs a compound arbitration in two stages to ensure priority bias with fairness. The first stage is a priority-biased arbitration stage and the second stage is a throughput-biased arbitration stage. The two stages are performed within the ingress. In each stage, bus bandwidth and processing resources necessitate the sharing of busses and processing among unicast and multicast paths. This is the basis for the arbitration at both Stage One and Stage Two. If there are multiple ingresses, an additional arbitration may be performed between the ingresses.

FIG. 1 is a block diagram of a traffic forwarding system 100 in accordance with an embodiment of the invention. The system 100 includes media modules 152, 154, 156, and 158, packet processor modules 102-1 to 102-N (referred to collectively as the packet processor modules 102) and 162-1 to 162-N (referred to collectively as the packet processor modules 162), and switching fabric 130. The media modules 152, 154, 156, and 158 are respectively coupled to the packet processor modules 102-1, 102-N, 162-1, and 162-N. It should be noted that in an embodiment each packet processor module is coupled to two or more media modules (not shown). The packet processor modules 102 and 162 are coupled to the switching fabric 130. The switching fabric includes circuitry to replicate cells by writing to multiple buffers. This functionality may be used with multicast cells that target a plurality of destinations. It should be noted that in an embodiment, the switching fabric includes two or more switching fabric modules. The packet processor module 102-1 includes an interface module 104-1 for forwarding packets to and from the media module 152, an ingress module 106-1 for forwarding cells to the switching fabric 130, and an egress module 108-1 for receiving cells from the switching fabric 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell.

Figure 2:
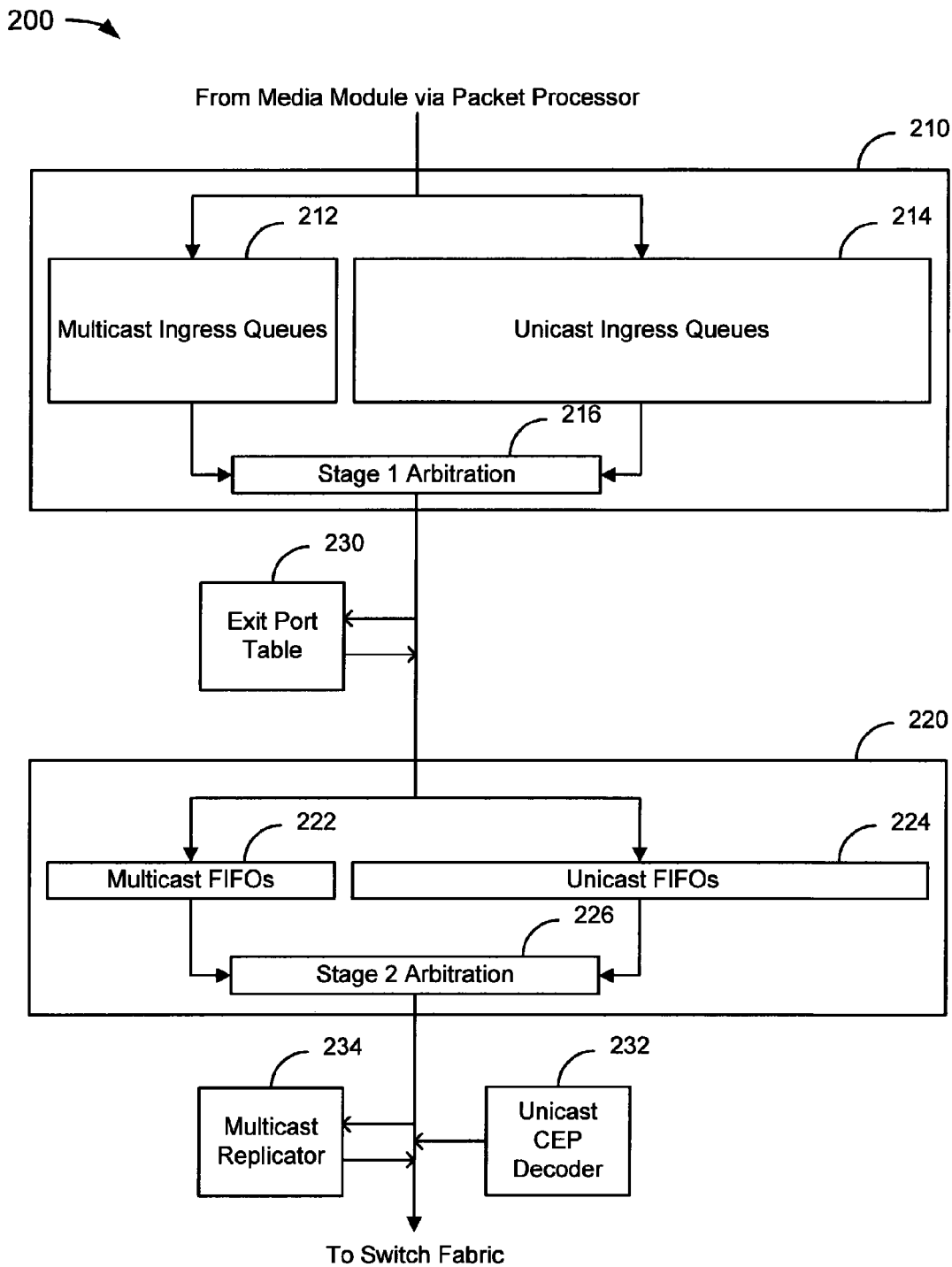
FIG. 2 is a block diagram of a packet processor ingress module in accordance with an embodiment of the invention, for use in the system of FIG. 1.

FIG. 2 is a block diagram of a packet processor ingress module 200 in accordance with an embodiment of the invention, for use in the system 100 (FIG. 1). The packet processor ingress module 200 includes ingress queue logic 210, exit first-in-first-out queue (exit FIFO) logic 220, an exit port table 230, unicast channel exit port (CEP) decoder logic 232, and multicast replicator logic 234. It should be noted that in an embodiment, the packet processor ingress module 200 is on a chip (e.g., an ingress chip), but the exit port table 230 is stored off-chip to conserve on-chip resources. It should further be noted that if an exit port is identified, an associated egress of the egress modules 108 (FIG. 1) is thereby identified. The ingress queue logic 210 includes multicast ingress queues 212, unicast ingress queues 214, and Stage One arbitration logic 216. Multicast cells from a media module are enqueued in the multicast ingress queues 212. Unicast cells from the media module are enqueued in the unicast ingress queues 214. It should be noted that in an embodiment the multicast ingress queues 212 and unicast ingress queues 214 are distinguished logically, but are structurally identical. The Stage One arbitration logic 216 arbitrates between the ingress queues 212 and 214. Stage One arbitration is discussed below with reference to FIGS. 5 to 7.

When a multicast cell wins Stage One arbitration, the exit port table 230 is consulted. The exit port table 230 provides a CEP designator for the multicast cell. Unicast cells have an encoded CEP designator that corresponds to the unicast ingress queue from which the cell was forwarded. Accordingly, consulting the exit port table 230 is not necessary when a unicast cell wins Stage One arbitration.

The exit FIFO logic 220 includes multicast exit FIFOs 222, unicast exit FIFOs 224, and a Stage Two arbitration logic 226. Multicast cells from the multicast ingress queues 212 are enqueued in the multicast exit FIFOs 222. Unicast cells from the unicast ingress queues 214 are enqueued in the unicast exit FIFOs 224. It should be noted that in an embodiment, the multicast exit FIFOs 222 and unicast exit FIFOs 224 are distinguished logically, but are structurally identical. The Stage Two arbitration logic 226 arbitrates between the exit FIFOs. Stage Two arbitration is discussed below with reference to FIGS. 5A and 8 to 9.

When a multicast cell wins Stage Two arbitration, the multicast replicator logic 234 is consulted. When a unicast cell wins Stage Two arbitration, the unicast CEP decoder logic 232 is executed. The multicast replicator logic 234 and the unicast CEP decoder logic 232 are discussed in more detail with reference to FIG. 4.

Figure 3:
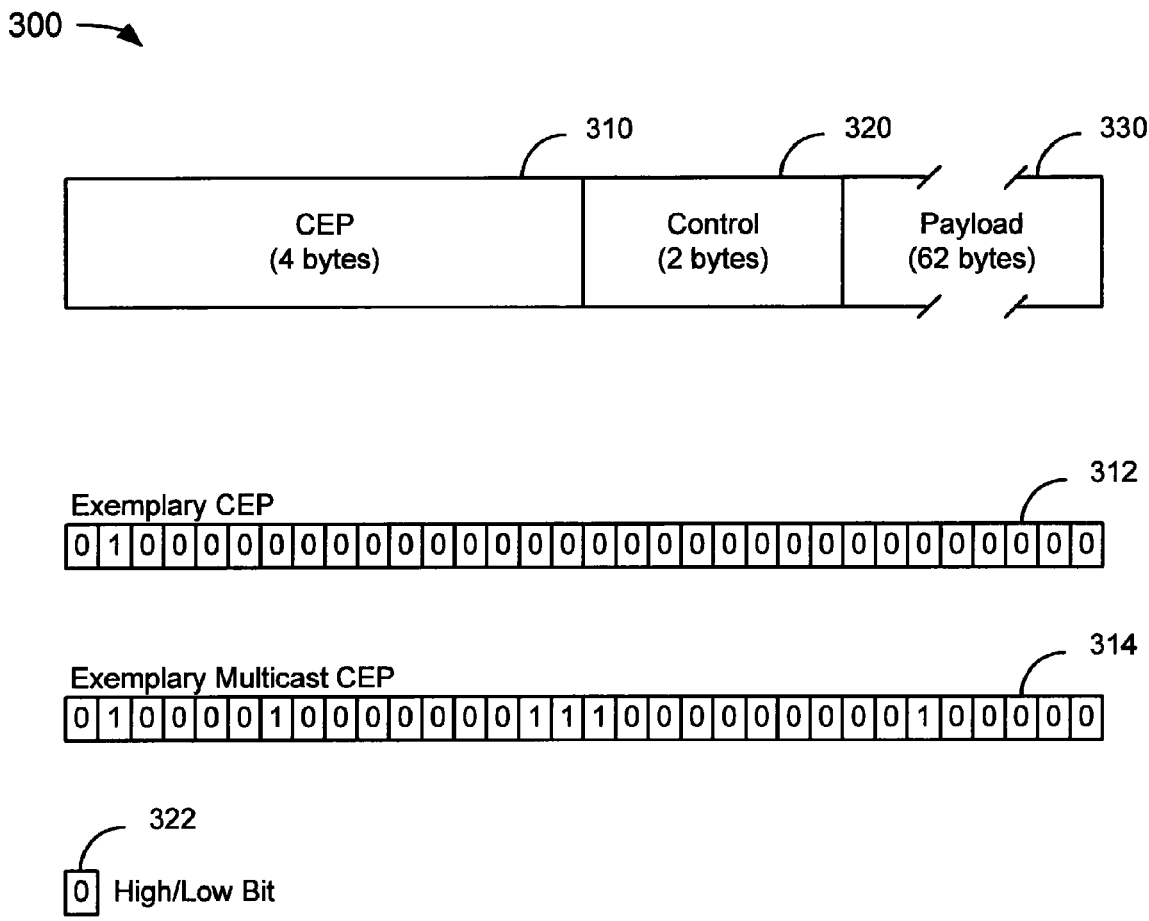
FIG. 3 is a block diagram of an exemplary cell for use in the system of FIG. 1.

FIG. 3 is a block diagram of an exemplary cell 300 as it appears when sent to the switching fabric 130 for use in the system of FIG. 1. The cell 300 includes a CEP field 310, a control field 320, and a payload 330. The CEP field 310 and control field 320 may be referred to as a header of the payload 330. Since, as described previously, the payload 330 may include a portion of a larger packet, for control and debugging purposes, the cells preferably include a start of packet (SOP) flag and an end of packet (EOP) flag in the control field 320. In an embodiment, the CEP field 310 is 4 bytes (32 bits) in length and the control field 320 is 2 bytes (16 bits) in length. The control field 320 preferably includes a high/low bit. In this embodiment, there are 64 egress modules 108 (FIG. 1). Each bit of the CEP field corresponds to either a first egress (low) or a second egress (high) in accordance with the high/low bit. In other words, the CEP field and the high/low bit together identify an egress. For example, an exemplary CEP field 312 of FIG. 3 has a 32-bit bit field with a bit set to '1' in location 1, where the locations range from 0 to 31. If the high/low bit 322 is set to '0', then the CEP field and high/low bit together identify the egress with an identifier of 1, where egress identifiers are 0 to 63 (0-31 low and 32-63 high). Note that if the high/low bit were set to '1', then the CEP field 312 and high/low bit together would instead identify the egress with an identifier of 33. The exemplary multicast CEP 314 and the high/low bit 322 together would identify six egresses, since the exemplary multicast CEP 314 has six 1's, as should be apparent from the previous example.

As described above with reference to FIG. 2, a unicast cell has an encoded CEP designator that is decoded by the CEP decoder logic 232 before the cell is sent from the packet processor ingress module 200 to the switching fabric 130 (FIG. 1). In other words, after a unicast cell is forwarded from a unicast ingress queue to a unicast exit FIFO with an encoded CEP designator in accordance with the unicast ingress queue, when the unicast cell is forwarded from the exit FIFO to the switching fabric 130, the unicast CEP decoder 232 decodes the CEP designator into a CEP field and an offset such that the CEP field and the offset correspond to the unicast ingress queue. In an embodiment, the CEP designator is larger than the CEP field 310 (FIG. 3) associated with the cell as it is sent to the switching fabric 130. In an alternative, the CEP designator is 64 bits long, the CEP field is 32 bits long, and the offset is a high/low bit. The CEP field and an offset, such as a high/low bit, as described with reference to FIG. 3, together identify a set of egresses.

As described above with reference to FIG. 2, a multicast cell has a CEP designator provided by the exit port table 230. The CEP designator is 64 bits long, longer than the CEP field 310 (FIG. 3), in the embodiment where the CEP field 310 and an offset are used together to identify a set of egresses. However, since a multicast cell may have multiple egress targets in its associated CEP designator, prior to forwarding a multicast cell to the switching fabric 130 (FIG. 1), the multicast replicator 234 (FIG. 2) may replicate a multicast cell if all multicast egress targets cannot be represented in a single CEP field. For example, assuming there are 64 possible egress targets (0 . . . 63), a 32-bit CEP field, and a high/low bit as offset, if a multicast cell targets an egress 0 and an egress 63, where egress 0 is identified using an offset of '0' and egress 63 is identified using an offset of '1', then it is not possible for the multicast cell to be associated with a single CEP field and offset that identify every egress target. Accordingly, the multicast replicator 234 may be required to replicate the multicast cell, divide the CEP designator into a low and high CEP field, and associate the low CEP field with a first replicated multicast cell with an offset of '0' and the high CEP field with a second replicated multicast cell with an offset of '1'. In other words, when a cell is forwarded from a multicast ingress queue to a multicast exit FIFO, the cell is associated with a CEP designator in accordance with the exit port table 230. The association includes turning on one or more bits of the CEP designator in accordance with the exit port table 230 such that each bit of the CEP designator identifies a respective egress. Since the CEP field to be associated with the cell is smaller than the CEP designator, the CEP designator is partitioned into non-overlapping portions with lengths equal to that of a CEP field, each portion being associated with the cell if at least one bit of its CEP designator partition is set. The multicast replicator 234 then replicates the cell and generates CEP fields and offsets for each replicant such that the CEP fields and offsets generated together correspond to each of the associated portions of the CEP designator.

Figure 4:
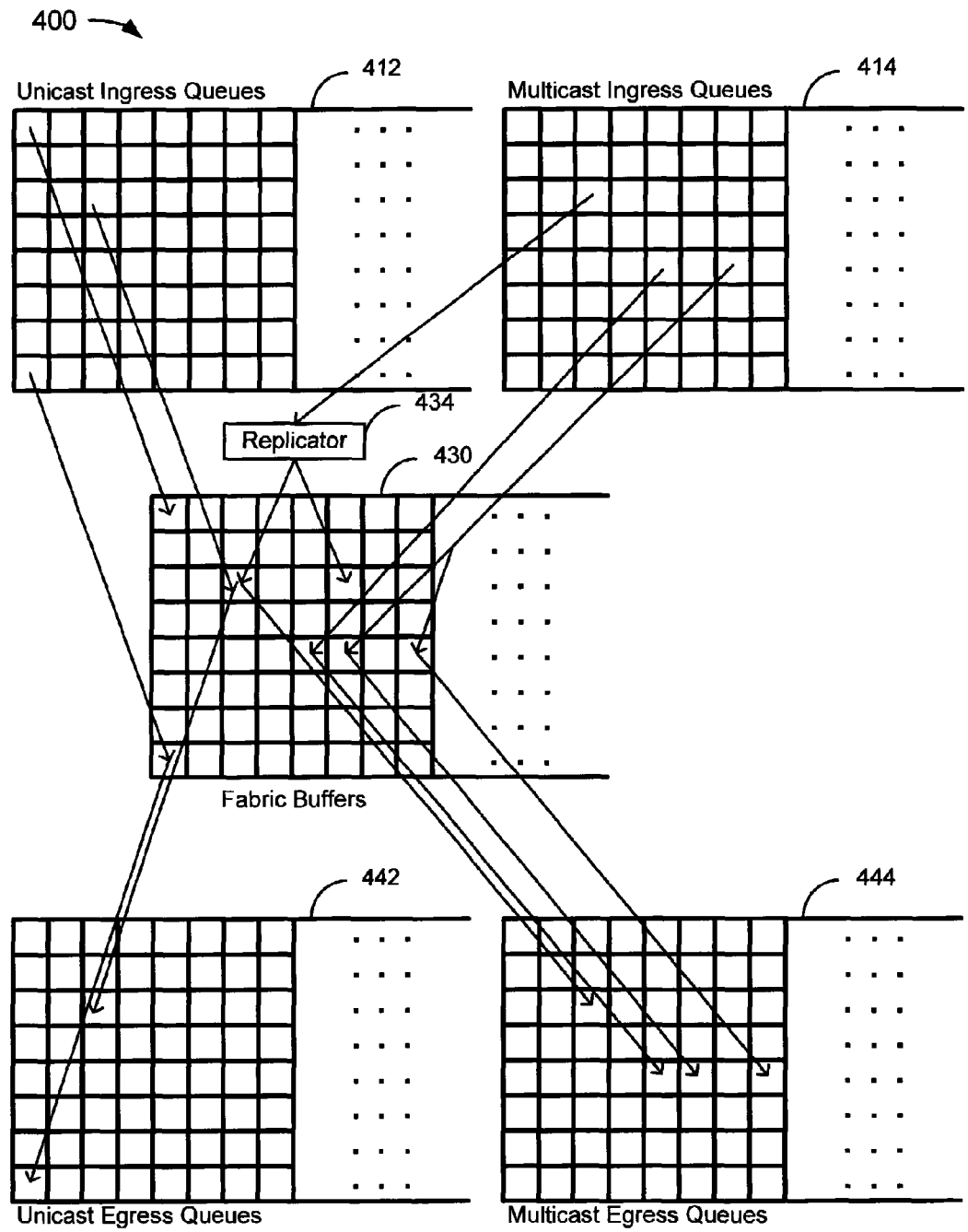
FIG. 4 depicts the forwarding of data through a fabric buffer in accordance with an embodiment of the invention.

FIG. 4 depicts an example of the forwarding of data through a fabric buffer 430 in accordance with an embodiment of the invention. A system 400 includes unicast ingress queues 412, multicast ingress queues 414, the fabric buffers 430, a multicast replicator 434, unicast egress queues 442, and multicast egress queues 444. The unicast ingress queues 412 are divided into 8 rows that represent 8 priorities and a variable number of columns. In an exemplary embodiment, the number of columns is 64. The fabric buffers 430 are divided into a like number of buffers (e.g., 8×64). The unicast egress queues 442 are also divided into a like number of queues (e.g., 8×64). The multicast ingress queues 414 are similarly divided into 8 rows that represent 8 priorities, but the number of columns is arbitrary and does not necessarily correspond to the number of columns in the fabric buffers 430 and the multicast egress queues 444. In an embodiment, the number of columns in the multicast ingress queues 414 is 32. The fabric buffers 430 do not distinguish between unicast and multicast. The multicast egress queues 444 correspond to the fabric buffers 430, so there are 8×64 multicast egress queues 444 in this example. The multicast replicator 434 may replicate a multicast cell in certain situations, such as described with reference to FIG. 3.

Since each unicast ingress queue corresponds to a fabric buffer in the fabric buffers 430, a unicast cell in a unicast ingress queue is forwarded to the fabric buffer that corresponds to the unicast ingress queue. The CEP field and offset are used to determine to which egress the cell should be forwarded. If the CEP field and offset indicate the cell should be forwarded to the unicast egress queues 442, then the cells are so forwarded. As shown if FIG. 4, two exemplary unicast cells target a queue of the unicast egress queues 442. A third exemplary unicast cell would also target a corresponding unicast egress queue (not shown so as to avoid cluttering the figure). Each queue of the unicast egress queues 442 corresponds to a queue of the unicast ingress queues 412 and a buffer of the fabric buffers 430. In an embodiment, each of the fabric buffers 430 corresponds to a unicast egress queue.

As shown in FIG. 4, each multicast ingress queue may not correspond to a fabric buffer in the fabric buffers 430. In FIG. 4, three exemplary multicast cells target one or more queues of the multicast egress queues 444. The first exemplary multicast cell is replicated at the multicast replicator 434 such that the replicants target first and second fabric buffers of the fabric buffers 430. The first replicant targets a first multicast egress queue that corresponds to the first fabric buffer. The second replicant would target a buffer that corresponds to the second fabric buffer (not shown so as to avoid cluttering the figure). In the example of FIG. 4, the second exemplary multicast cell from a second multicast ingress queue of the multicast ingress queues 414 targets a third multicast egress queue of the multicast egress queues 444. The third exemplary multicast cell targets fourth and fifth multicast egress queues of the multicast egress queues 444. The third exemplary multicast cell is written to a plurality of fabric buffers in accordance with their respective CEP designations, as described above with reference to FIG. 3. Any of the exemplary multicast cells may target additional multicast egress queues (not shown), depending upon whether other multicast egress queues are represented in their respective CEP designators.

Figure 5A:
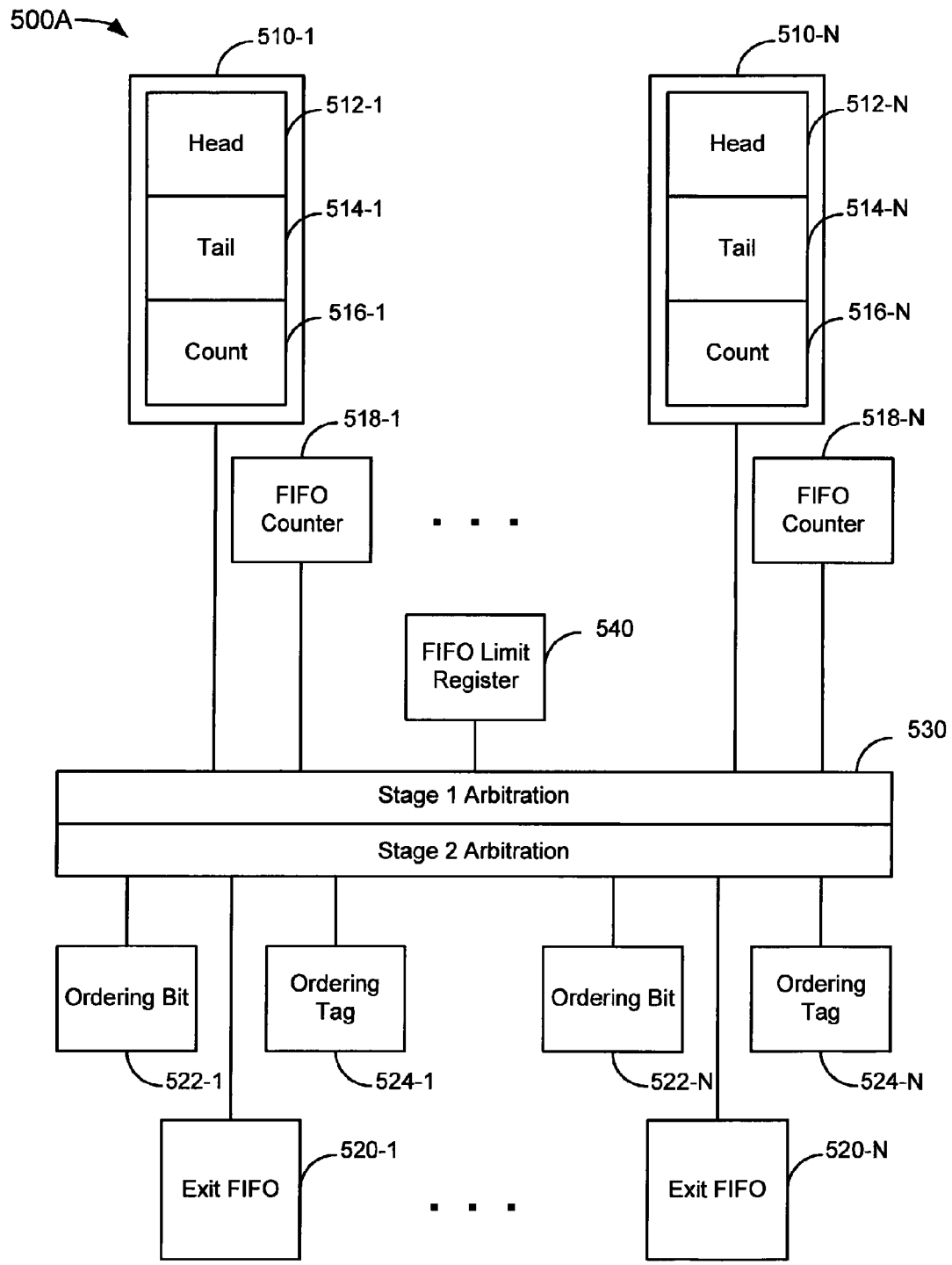
FIGS. 5A and 5B are block diagrams of subsystems of an ingress system in accordance with an embodiment of the invention, for use in the system of FIG. 1.

FIG. 5A is block diagram of a subsystem 500A of an ingress system in accordance with an embodiment of the invention, for use in the system of FIG. 1. The function of subsystem 500A is described in more detail with reference to FIGS. 7A to 7C and 9A to 9D. The subsystem 500A includes ingress queues 510-1 to 510-N, FIFO counters 518-1 to 518-N respectively associated with the ingress queues 510-1 to 510-N, exit FIFOs 520-1 to 520-N, ordering bits 522-1 to 522-N respectively associated with the exit FIFOs 520-1 to 520-N, ordering tags 524-1 to 524-N respectively associated with the exit FIFOs 520-1 to 520-N, a compound arbitration logic 530, and a FIFO limit register 540. The queues include a head pointer 512-1 to 512-N, a tail pointer 514-1 to 514-N, and a count 516-1 to 516-N. The pointers point to cells in an off-chip pointer memory, such as random access memory (RAM). Each head pointer 512 points to the first cell in the respective queue 510. Next pointers are managed off-chip. Each tail pointer 514 points to the last cell in the respective queue 510. The value of each count 516 is indicative of the number of cells in the respective queue 510. Each FIFO counter 518 is configured to hold a value indicative of the current number of exit FIFOs being used by the respective ingress queue 510. The pointers and count are each 4 bytes long and the FIFO counter is 6 bits long, so the per-queue on-chip resource requirements are low. The FIFO limit register 540 is configured to hold a value indicative of the maximum number of exit FIFOs that may be used by each of the ingress queues 510. The FIFO limit register 540 is 6 bits long. The ordering bits 522-1 to 522-N and ordering tags 524-1 to 524-N are explained in more detail with reference to FIGS. 9A to 9C.

In an embodiment, multicast queues self-restrict so an associated FIFO counter is not necessary for multicast queues. For example, the multicast queues may be limited to four active queues at a time. A queue is active if it sends a cell with a SOP flag set, but has not yet sent a cell with an EOP flag set. If the number of queues that are active exceeds a predetermined limit, or four in this case, then an override function excludes any inactive queues from arbitration until an active queue sends a cell with an EOP flag set. In other words, when an active multicast ingress queue has forwarded a starting cell with an SOP flag set, but has not forwarded an ending cell that is associated with the starting cell, then the queue is designated as an active queue. Otherwise, the queue is inactive. When as many multicast ingress queues as the maximum number are activated by forwarding cells with SOP flags, inactive multicast ingress queues are excluded from the priority-biased arbitration stage until at least one active queue becomes inactive.

Figure 5B:
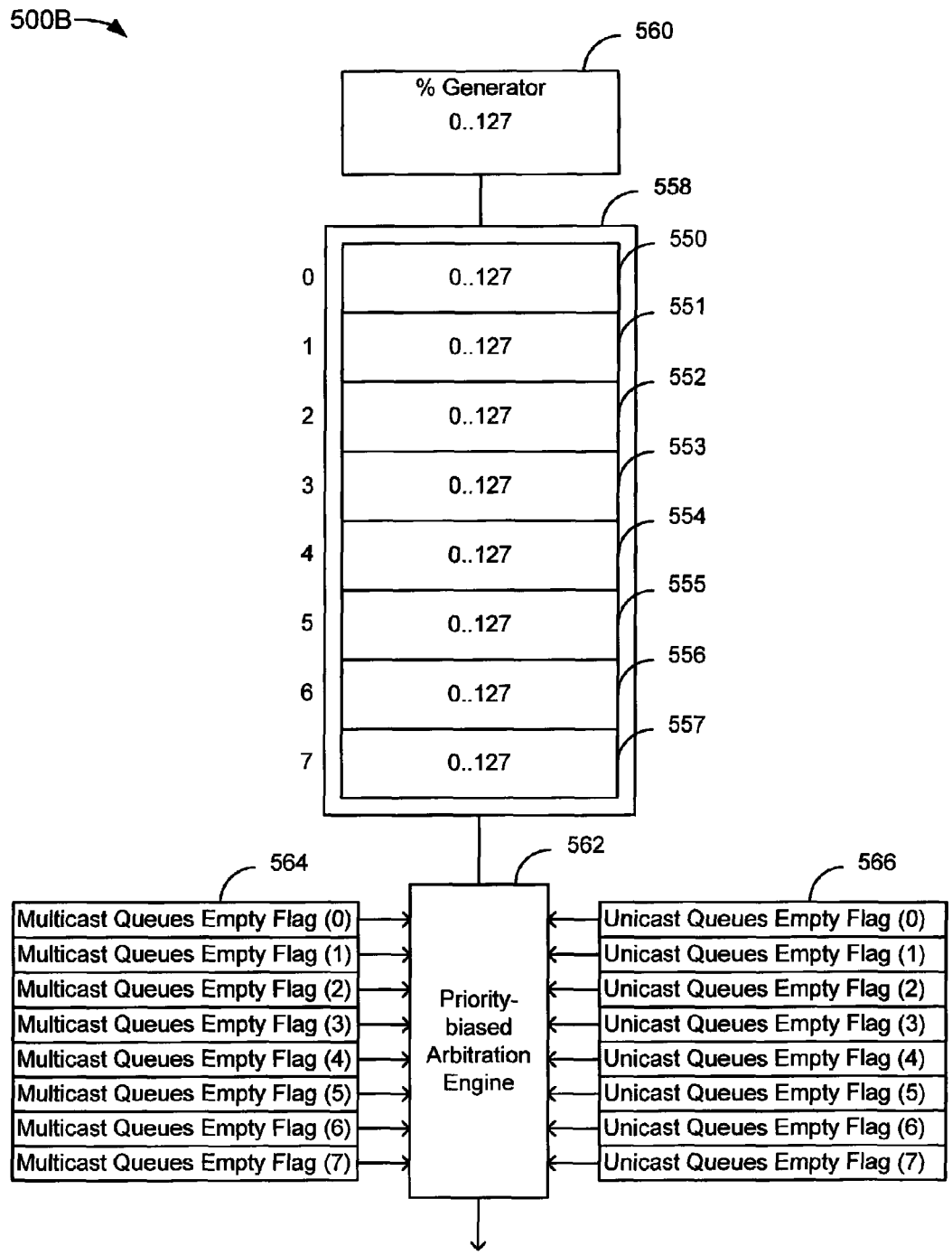

FIG. 5B is block diagram of a subsystem 500B of an ingress system in accordance with an embodiment of the invention. The function of a first subsystem 500B in an embodiment is described in more detail with reference to FIG. 7C. The function of a second subsystem 500B in an embodiment is described in more detail with reference to FIG. 7D. The subsystem 500B includes a number (%) generator 560, a probability register block 558, a priority-biased arbitration engine 562, multicast queues empty flag inputs 564, and unicast queues empty flag inputs 566. The number generator 560 generates a number between 0 and 127. The number is input to the probability register block 558. The probability register block 558 includes one register per priority level. In the embodiment of FIG. 5B, there are 8 registers 550-557 that correspond to 8 priority levels 0-7. The registers 550-557 may be set to a value from zero to the highest number that may be generated by the number generator 560. However, in an embodiment, the sum of the registers 550-557 should not exceed the highest number that may be generated by the number generator 560. For example, if the highest number generated by the number generator 560 is '127', then the sum of the registers 550-557 should not exceed '127'. If the sum of the registers 550-557 is less than the highest number that may be generated by the number generator 560, then a priority is preferably selected by round robin if the number generated by the number generator 560 is higher than the sum of the registers 550-557. For example, if the sum of the registers 550-557 is '100' and the number generator 560 generates a number '110', then a priority is selected by round robin. In other cases, the number generated should correspond to one of the registers 550-557 and the probability register block 558 outputs the corresponding priority level to the priority-biased arbitration engine 562. For example, if the registers 550-556 have respective probabilities of '15' and the register 557 has a probability of selection of '23', then priority 0 is selected if the number generator generates a number from '0' to '14'; priority 1 if 15-29; priority 2 if 30-44; priority 3 if 45-59; priority 4 if 60-74; priority 5 if 75-89; priority 6 if 90-104; and priority 7 if 105-127. In this case, if the number generator 560 generates a number, '0', then the priority 7 is selected. The priority is output to the priority-biased arbitration engine 562. The priority-biased arbitration engine 562 also receives the multicast queues empty flag inputs 564, which further include multicast queue empty flags for each priority, and the unicast queues empty flag inputs 566, which further include unicast queue empty flags for each priority. The priority-biased arbitration engine 562 uses the inputs in the manner described below with reference to FIG. 7C or 7D. It should be noted that in an embodiment setting a probability register to '0' makes the priority associated with the register a strict priority.

Figure 6:
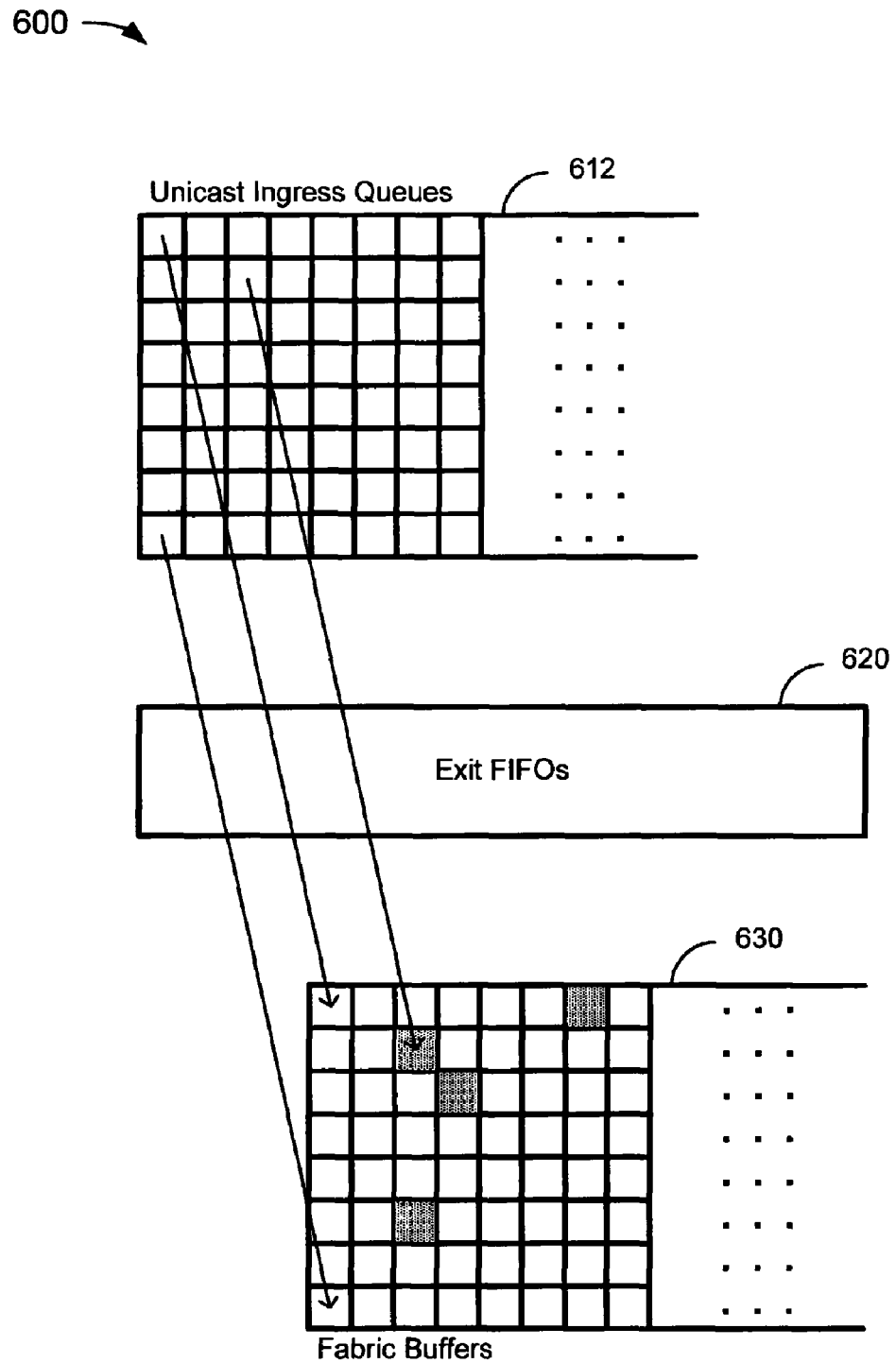
FIG. 6 depicts the forwarding of data to a fabric buffer in accordance with an embodiment of the invention.

FIG. 6 depicts the forwarding of data to a switching fabric in accordance with an embodiment of the invention. FIG. 6 is intended to illustrate an optimization for a Stage One, or priority-biased, arbitration. Namely, excluding an ingress queue from the priority-biased arbitration stage if a buffer of the fabric buffers 630 that corresponds to the ingress queue is unavailable. In FIG. 6, in a system 600, unicast ingress queues 612 forward cells through exit FIFOs 620 to fabric buffers 630. The shaded boxes of fabric buffers 630 indicate unavailable fabric buffers. Fabric buffers are unavailable if, for example, they are full. In accordance with this optimization, cells that target an unavailable fabric buffer are excluded from priority-biased arbitration.

Figure 7A:
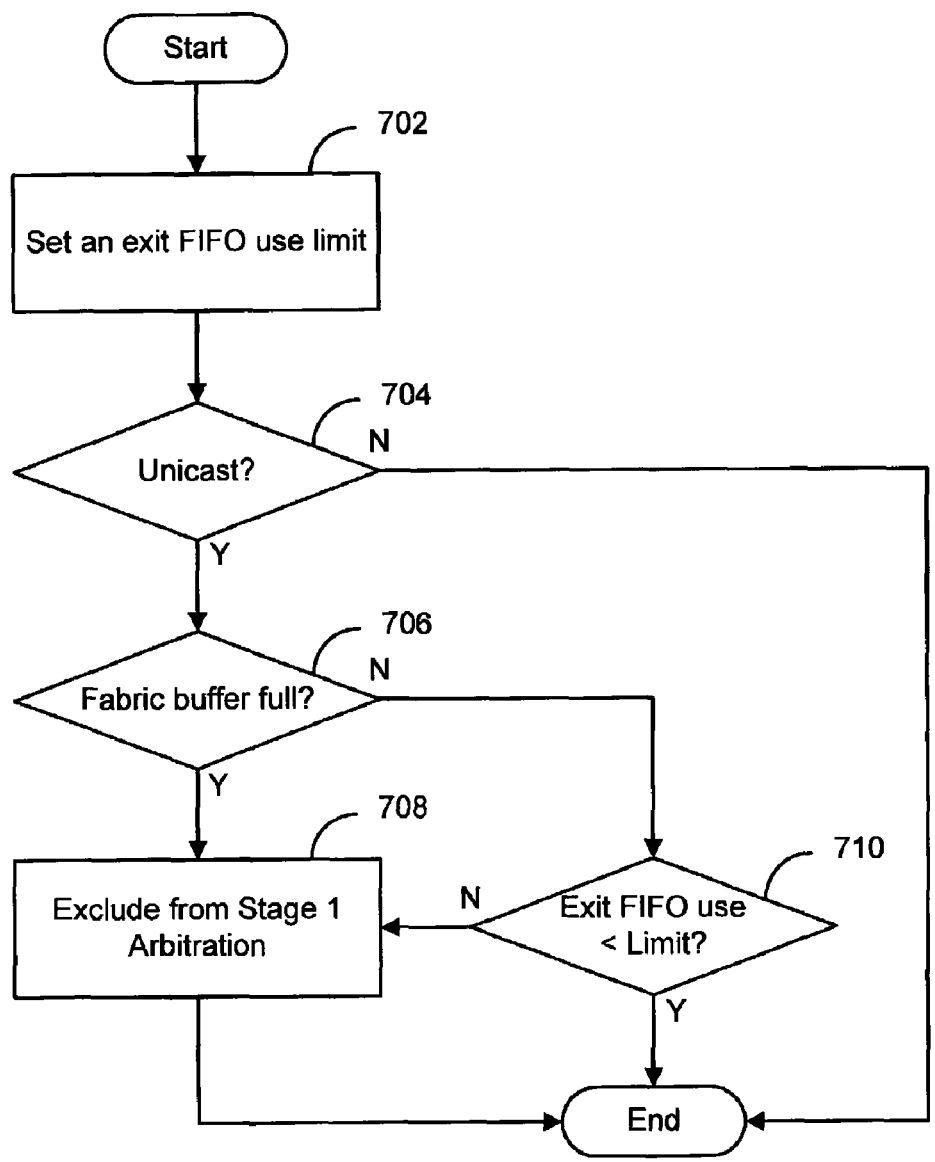
FIGS. 7A to 7D are flowcharts of methods in accordance with embodiments of the invention.

FIG. 7A is a flowchart 700A of a method in accordance with an embodiment of the invention. FIG. 7A is intended to show how unicast queues are excluded from arbitration to optimize Stage One arbitration. The flowchart 700A starts with setting an exit FIFO use limit at step 702. This limit is indicative of the maximum number of exit FIFOs that may be used by an ingress queue at one time. At decision point 704, it is determined whether an ingress queue is a unicast ingress queue. If so, it is determined whether a fabric buffer that corresponds to the ingress queue is full or otherwise unavailable at decision point 706. If not, the flowchart 700A ends; the ingress queue is not excluded from Stage One arbitration. If at decision point 706 the fabric buffer that corresponds to the ingress queue is full, the ingress queue is excluded from Stage One arbitration at step 708 and the flowchart 700A ends. Otherwise, it is determined whether the ingress queue is using a number of exit FIFOs that is less than the exit FIFO use limit at decision point 710. If at decision point 710 the ingress queue is using less than the exit FIFO use limit, the flowchart 700A ends; the ingress queue is not excluded from Stage One arbitration. Otherwise, the ingress queue is excluded from Stage One arbitration at step 708 and the flowchart 700A ends.

Figure 7B:
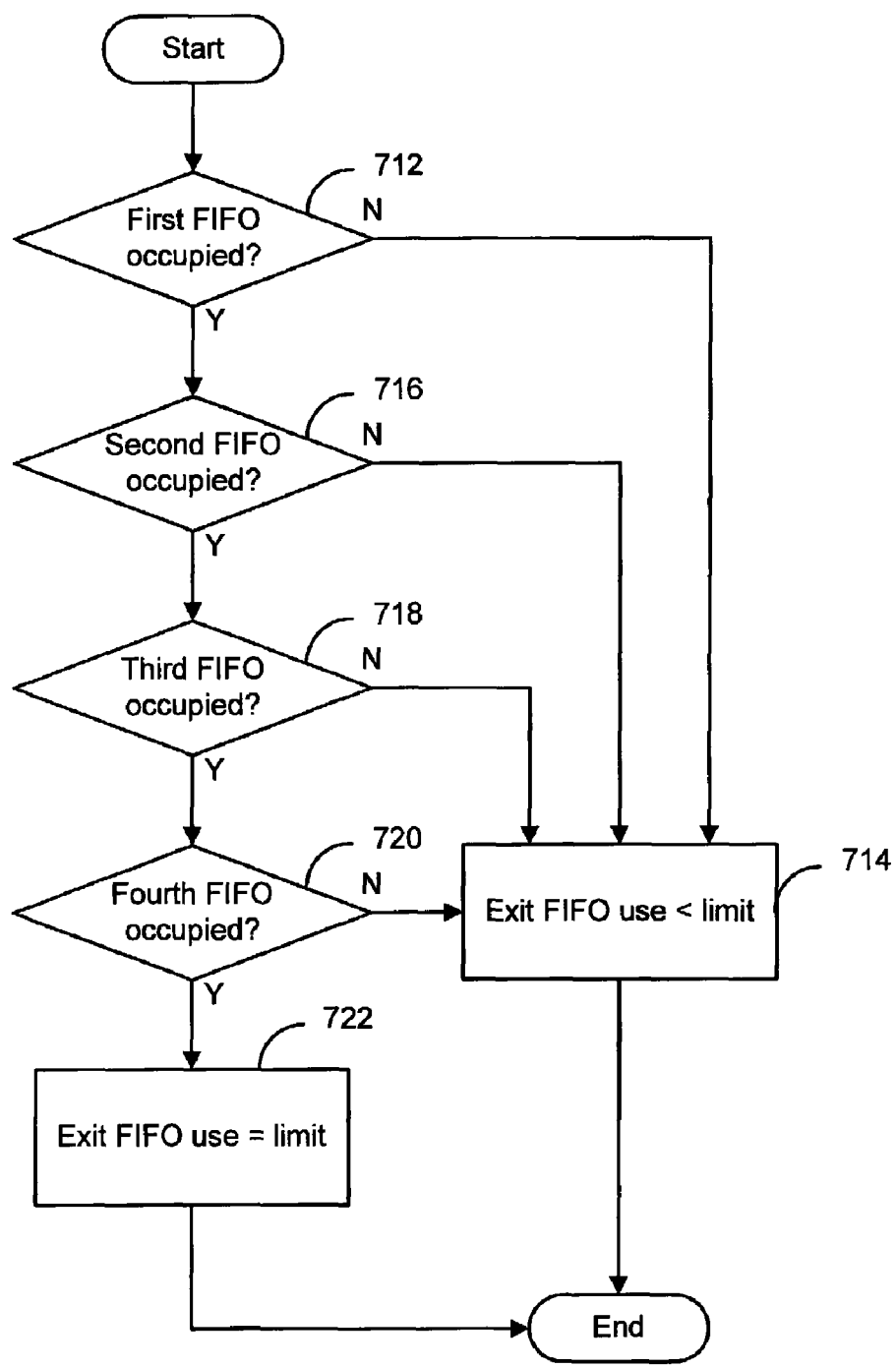

FIG. 7B is a flowchart 700B of a method in accordance with an embodiment of the invention. In an embodiment, the flowchart 700B is incorporated into decision point 710 of the flowchart 700A. In the embodiment depicted in FIG. 7B, the exit FIFO use limit is four. The flowchart 700B starts at decision point 712 where it is determined whether a first exit FIFO is occupied. In an embodiment, exit FIFOs are occupied if they currently contain valid data from the ingress queue in question. If a first exit FIFO is not occupied, then the current exit FIFO use is less than the exit FIFO use limit at step 714. This is true because up to four exit FIFOs may be used by an ingress queue and a first exit FIFO has not yet been used in this case. Otherwise, at decision point 716, it is determined whether a second exit FIFO is occupied. If a second exit FIFO is not occupied, then the current exit FIFO use is less than the exit FIFO use limit at step 714. Otherwise, at decision point 718, it is determined whether a third exit FIFO is occupied. If a third exit FIFO is not occupied, then the current exit FIFO use is less than the exit FIFO use limit at step 714. Otherwise, at decision point 720, it is determined whether a fourth exit FIFO is occupied. If a fourth exit FIFO is not occupied, then the current exit FIFO use is less than the exit FIFO use limit at step 714. Otherwise the current exit FIFO use is at least the exit FIFO use limit at step 722, which is four in this case. When the flowchart 700B ends, the flowchart 700A resumes at decision point 710. If the exit FIFO use is less than the limit at step 714, then decision point 710 is true and flowchart 700A ends. If the exit FIFO use is at least equal to the limit at step 722, then decision point 710 is not true and flowchart 700A continues at step 708, excluding the ingress queue from Stage One arbitration, then ends.

Figure 7C:
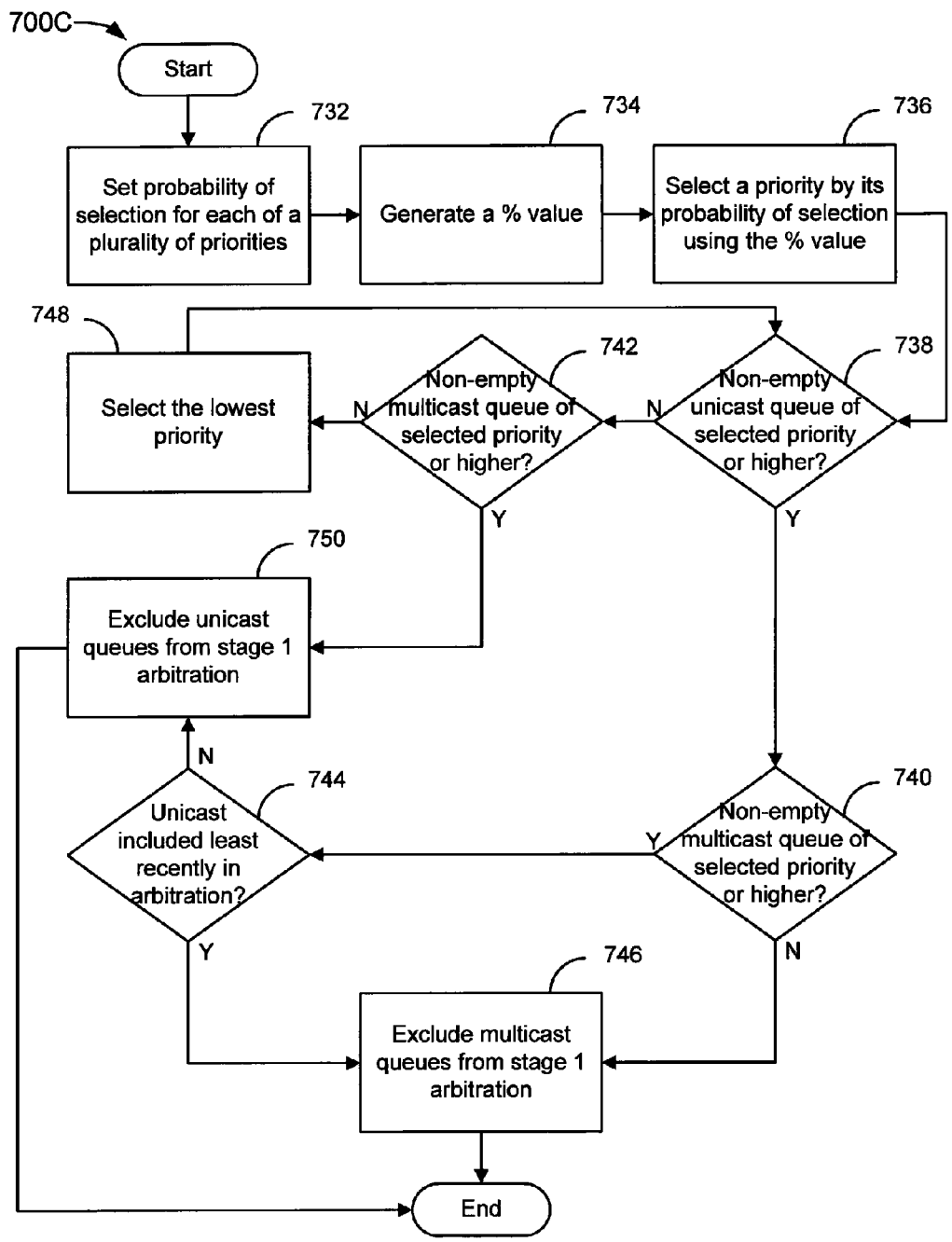

FIG. 7C is a flowchart 700C of a method in accordance with an embodiment of the invention. FIG. 7C is intended to demonstrate how either unicast or multicast queues are excluded from Stage One arbitration with a priority bias. The exclusion is accomplished by 1) excluding a first subset of ingress queues if the first subset does not include cells of a selected priority or higher and a second subset includes cells of the selected priority or higher, 2) excluding the second subset of ingress queues if the second subset does not include cells of the selected priority or higher and the first subset includes cells of the selected priority or higher, or, 3) if neither or both of the first and second subsets have cells of the selected priority or higher, excluding either the first subset or second subset by round robin selection. The flowchart 700C starts with setting a probability of selection for each of a plurality of priorities at step 732. At step 734, a number (%) is generated. At step 736, a priority of the plurality of priorities is selected using the number. If the sum of the probabilities of selection is less than the number generated, then the lowest priority is selected. At decision point 738, it is determined whether there is a non-empty unicast queue of the selected priority or higher. If so, then at decision point 740, it is determined whether there is a non-empty multicast queue of the selected priority or higher. If not, then at decision point 742, it is determined whether there is a non-empty multicast queue of the selected priority or higher. If there is a nonempty multicast queue at decision point 740, then at decision point 744 it is determined whether a unicast queue was included least recently in arbitration. This is in accordance with round robin selection. If there is not a non-empty multicast queue at step 740, then multicast queues are excluded from arbitration at step 746 and the flowchart 700C ends. If there is a non-empty multicast queue of the selected priority or higher at step 742, then unicast queues are excluded from Stage One arbitration at step 750 and the flowchart 700C ends. Otherwise, if there is not a non-empty multicast queue of the selected priority or higher at step 742 then the lowest priority is selected at step 748 and the flowchart 700C continues at decision point 738. If at step 744 it is determined that a unicast queue was least recently included in Stage One arbitration, then multicast queues are excluded from Stage One arbitration at step 746 and the flowchart 700C ends. Otherwise, if it is determined that a unicast queue was not least recently included in Stage One arbitration, then unicast queues are excluded from Stage One arbitration at step 750 and the flowchart 700C ends. In each case, when the flowchart 700C ends, either the unicast queues or the multicast queues have been excluded from Stage One arbitration.

Figure 7D:
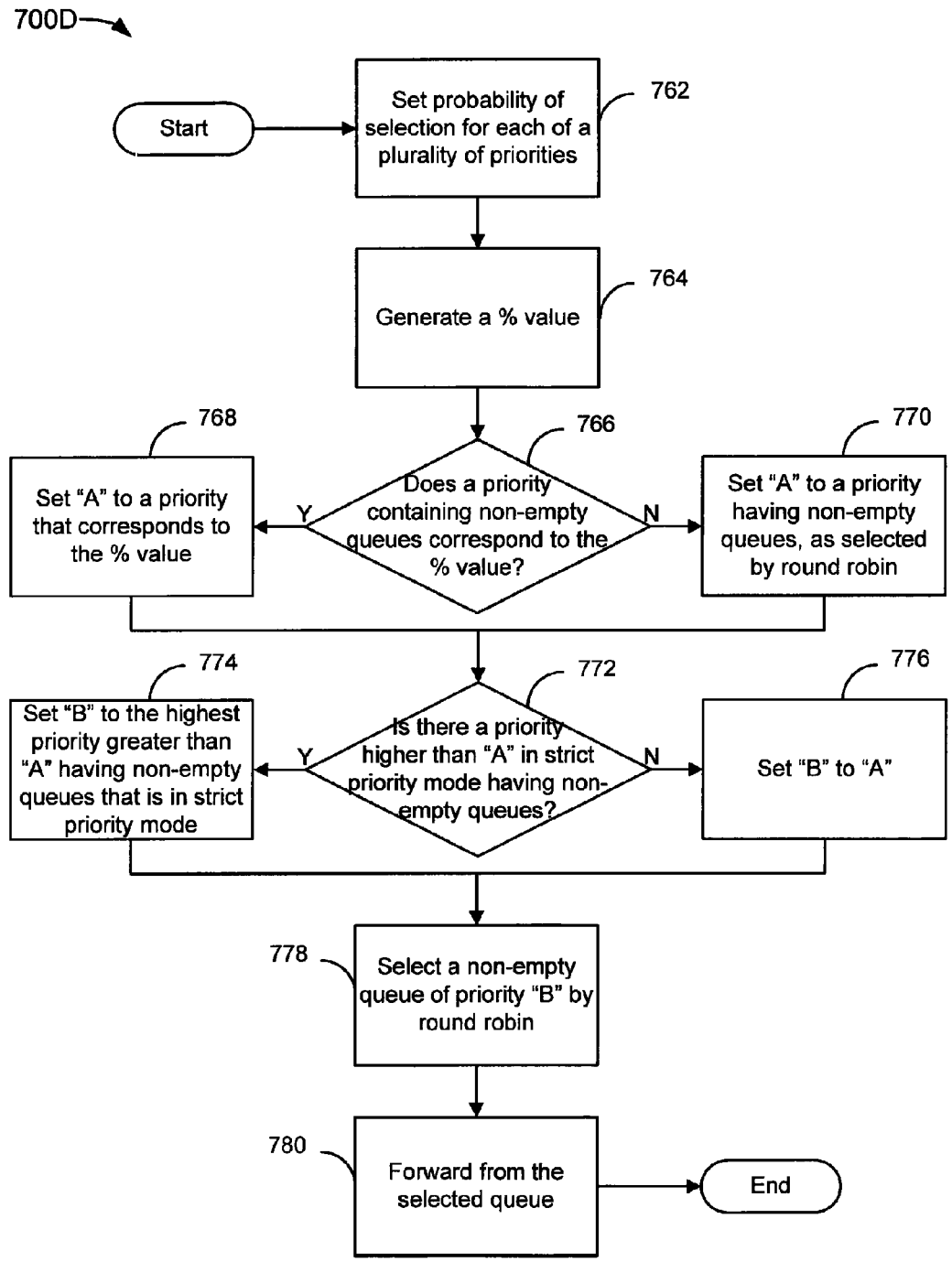

FIG. 7D is a flowchart 700D of a method in accordance with an embodiment of the invention. FIG. 7D is intended to demonstrate how a non-empty queue is determined to be the winner of Stage One arbitration with a priority bias. The determination is made by selecting a priority using a number generator and probability registers, as discussed with reference to FIG. 5B, by selecting a priority by round robin if all queues of the probability selected priority are empty or excluded from arbitration, or in accordance with strict priority, if a non-empty, non-excluded queue of higher priority that the current selected priority is programmed to arbitrate according to strict priority. Then, selecting a non-empty, non-excluded queue of the selected priority from amongst all of the non-empty, non-excluded queues of the selected priority by round robin as the winner of Stage One arbitration. In other words, determining a first priority, selecting a second priority if the ingress queues do not include non-empty, non-excluded queues having the first priority, by establishing a third priority that equals the second priority if the ingress queues do not include non-empty, non-excluded queues having the first priority or by establishing a third priority that equals the first priority if the ingress queues do include non-empty, non-excluded queues having the first priority, then selecting a non-empty queue having the third priority by round robin, and forwarding from the non-empty, non-excluded queue. In an embodiment, the third priority may be reestablished at a higher priority if the higher priority is a strict priority and the ingress queues include non-empty, non-excluded queues of the higher priority. It should be noted that in an embodiment, either multicast or unicast queues have been excluded from Stage One arbitration prior to the start of flowchart 700D. For the purposes of flowchart 700D, queues that are excluded from Stage One arbitration are treated as if they are empty. The flowchart 700D starts at step 762 with setting the probability of selection for each of a plurality of priorities. At step 764, a number (%) is generated. At decision point 766, it is determined whether a priority corresponds to the number generated in step 764 and whether there are non-empty queues of the priority. If so, then at step 768 "A" is set to the priority that corresponds to the number generated in step 764. If not, then at step 770 "A" is set to a priority having non-empty queues by round robin selection. In either case, at decision point 772, it is determined whether there is a priority higher than "A" that is set to strict priority mode and that has non-empty queues. In one embodiment, strict priority mode is set by setting the probability of selection for one or more priorities to zero at step 762. If at decision point 772 there is a priority higher than "A" in strict priority mode that has non-empty queues, then at step 774 "B" is set to the highest priority greater than "A" having non-empty queues that is in strict priority mode. Otherwise, at step 776 "B" is set to "A". In either case, at step 778 a non-empty queue of priority "B"

is selected by round robin. The selected queue is the winner of Stage One arbitration. At step 780, a cell is forwarded from the selected queue and the flowchart 700D ends.

Figure 8A:
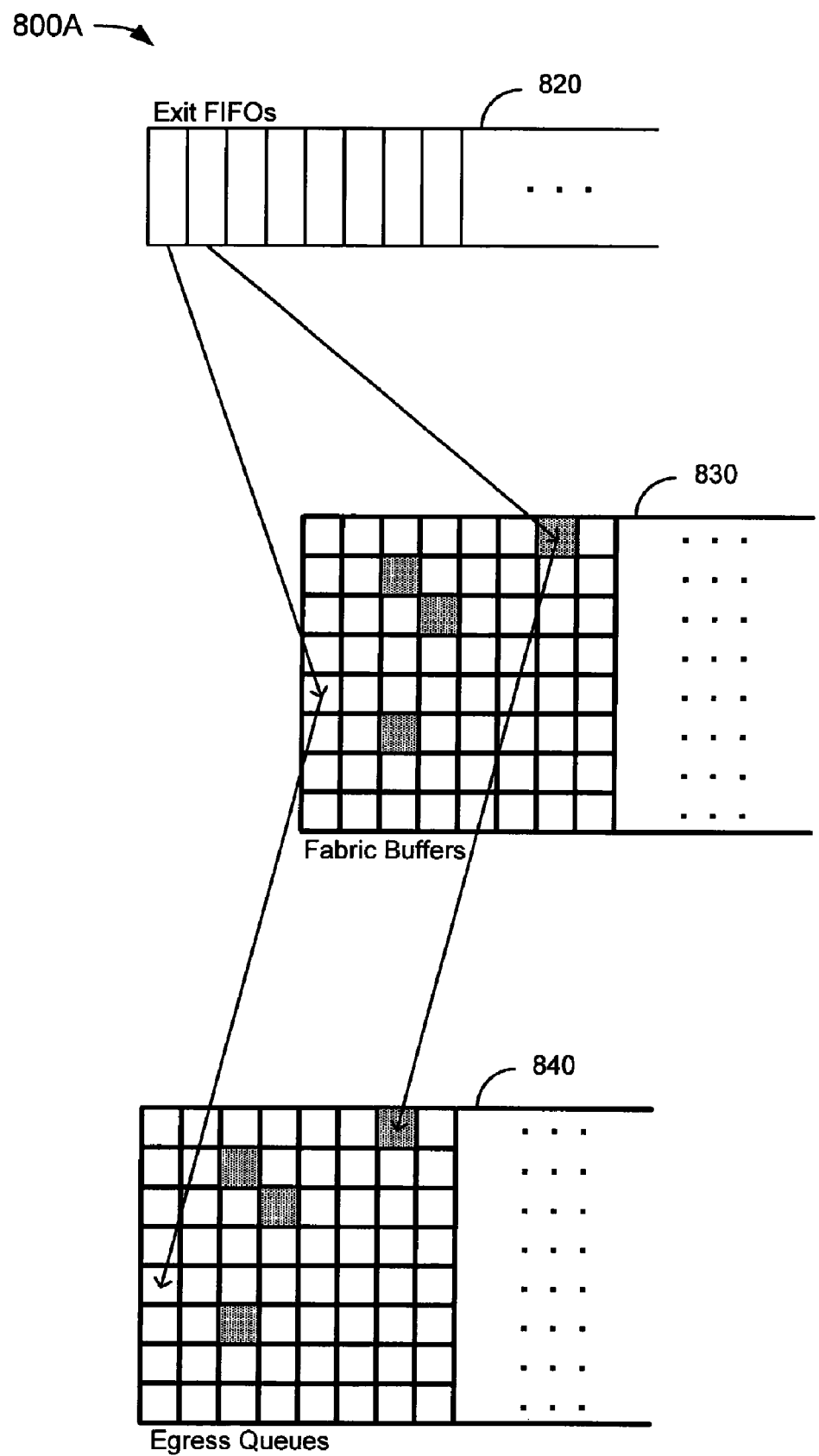
FIGS. 8A and 8B depict the forwarding of data to egress queues in accordance with embodiments of the invention.
Figure 8B:
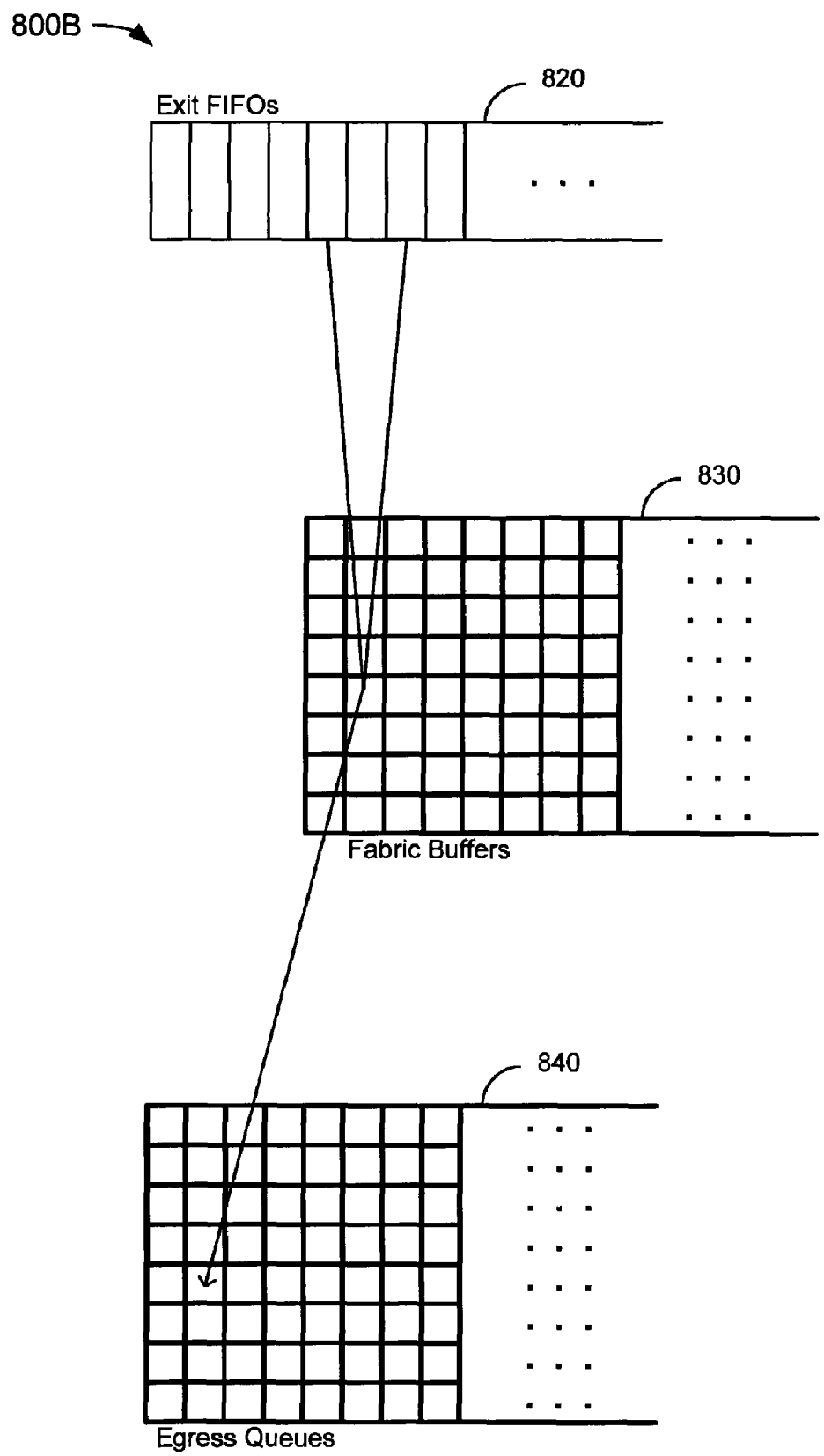

FIGS. 8A and 8B depict the forwarding of data to egress queues in accordance with embodiments of the invention. In FIG. 8A, two exit FIFOs 820 target two egress queues 840 via two fabric buffers 830. A first exit FIFO targets an available egress queue and a second exit FIFO targets an unavailable egress queue. The second egress queue is excluded from Stage Two arbitration. It should be noted that in an embodiment, the actual state of the second egress queue is not known at Stage Two arbitration; the state of the fabric buffer is determinative. In FIG. 8B, two multicast exit FIFOs 820 target one of egress queues 840 via fabric buffers 830. A first multicast exit FIFO will not necessarily be excluded from Stage Two arbitration. However, a second multicast exit FIFO will be excluded because two multicast exit FIFOs are not permitted to transmit to the same egress queue simultaneously. When the first multicast exit FIFO is finished transmitting to the egress queue, the second multicast exit FIFO will no longer necessarily be excluded from Stage Two arbitration. In an embodiment, cells associated with a first packet occupy more than one multicast exit FIFO, cells associated with a second packet which has an overlapping list of target egress queues occupy another multicast exit FIFO, and the multicast exit FIFO associated with the second packet is excluded from Stage Two arbitration until all of the cells of the first packet have been transmitted to the egress queues.

Figure 9A:
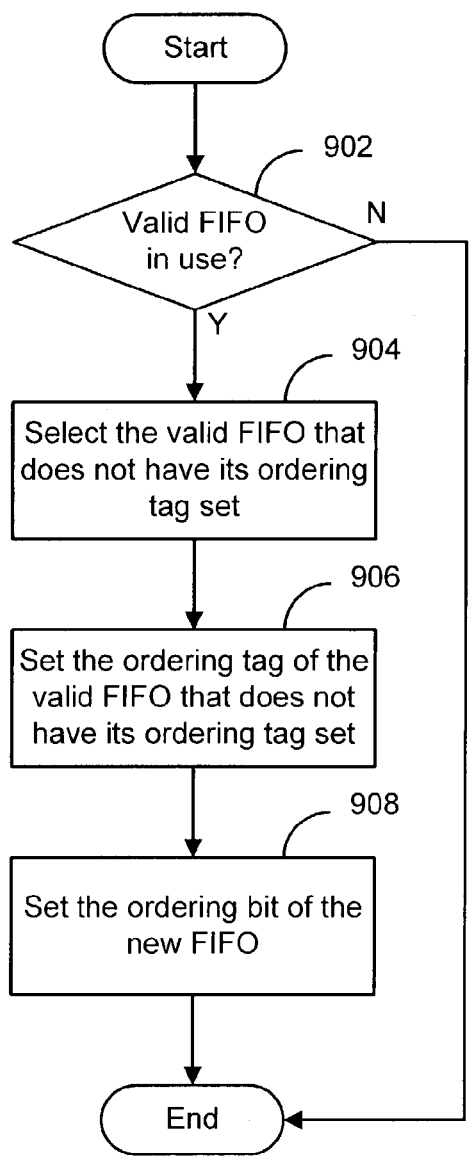
FIGS. 9A to 9D are flowcharts of methods in accordance with embodiments of the invention.

FIG. 9A is a flowchart 900A of a method in accordance with an embodiment of the invention. FIG. 9A is intended to illustrate how ordering flags and ordering tags are set after an ingress queue wins Stage One arbitration. Ordering flags and ordering tags are used to ensure that exit FIFOs used by an ingress queue forward cells in the order received. In other words, a first exit FIFO to which the ingress queue first forwards data should win arbitration before a second exit FIFO to which the ingress queue later forwards data, a second exit FIFO before a third and so forth. When an ordering flag is set for a second exit FIFO, it indicates a first exit FIFO has not yet completed sending its contents to the fabric buffers. When a first exit FIFO has an ordering tag that identifies a second exit FIFO, when the first exit FIFO completes sending its contents to the fabric buffers, the ordering flag of the second exit FIFO is reset. The flowchart 900A starts at decision point 902, where it is determined whether there are one or more valid (non-empty) FIFOs in use by an ingress queue. If so, then a valid FIFO in use by the ingress queue that does not have its associated ordering tag set is selected at step 904, the ordering tag of the selected FIFO is set to identify a new FIFO to be used by the ingress queue at step 906, the ordering bit of the new FIFO is set at step 908, and the flowchart 900A ends. If no valid FIFOs are currently in use by the ingress queue, then the flowchart 900A ends without setting an ordering tag or ordering bit.

Figure 9B:
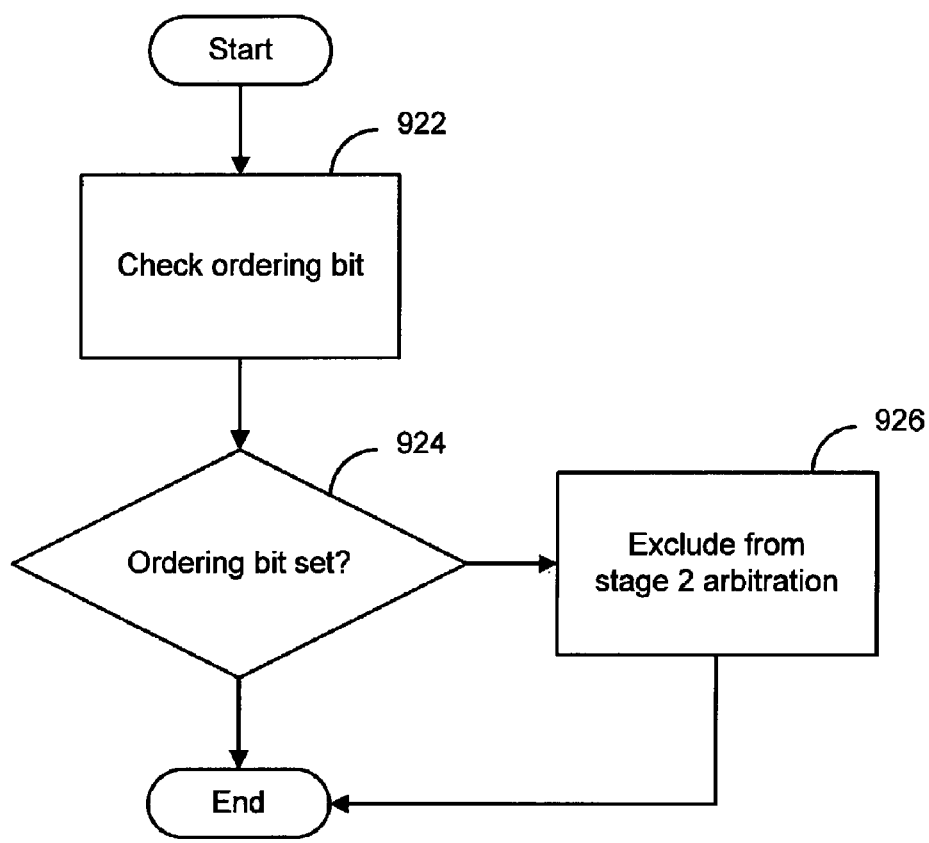

FIG. 9B is a flowchart 900B of a method in accordance with an embodiment of the invention. FIG. 9B is intended to illustrate how the ordering bit is used to exclude an exit FIFO from Stage Two arbitration. The flowchart 900B starts at step 922 with checking the ordering bit of an exit FIFO. At decision point 924, it is determined whether the ordering bit is set. If so, the exit FIFO is excluded from Stage Two arbitration at step 926 and the flowchart 900B ends. If not, the flowchart 900B ends without excluding the exit FIFO from Stage Two arbitration.

Figure 9C:
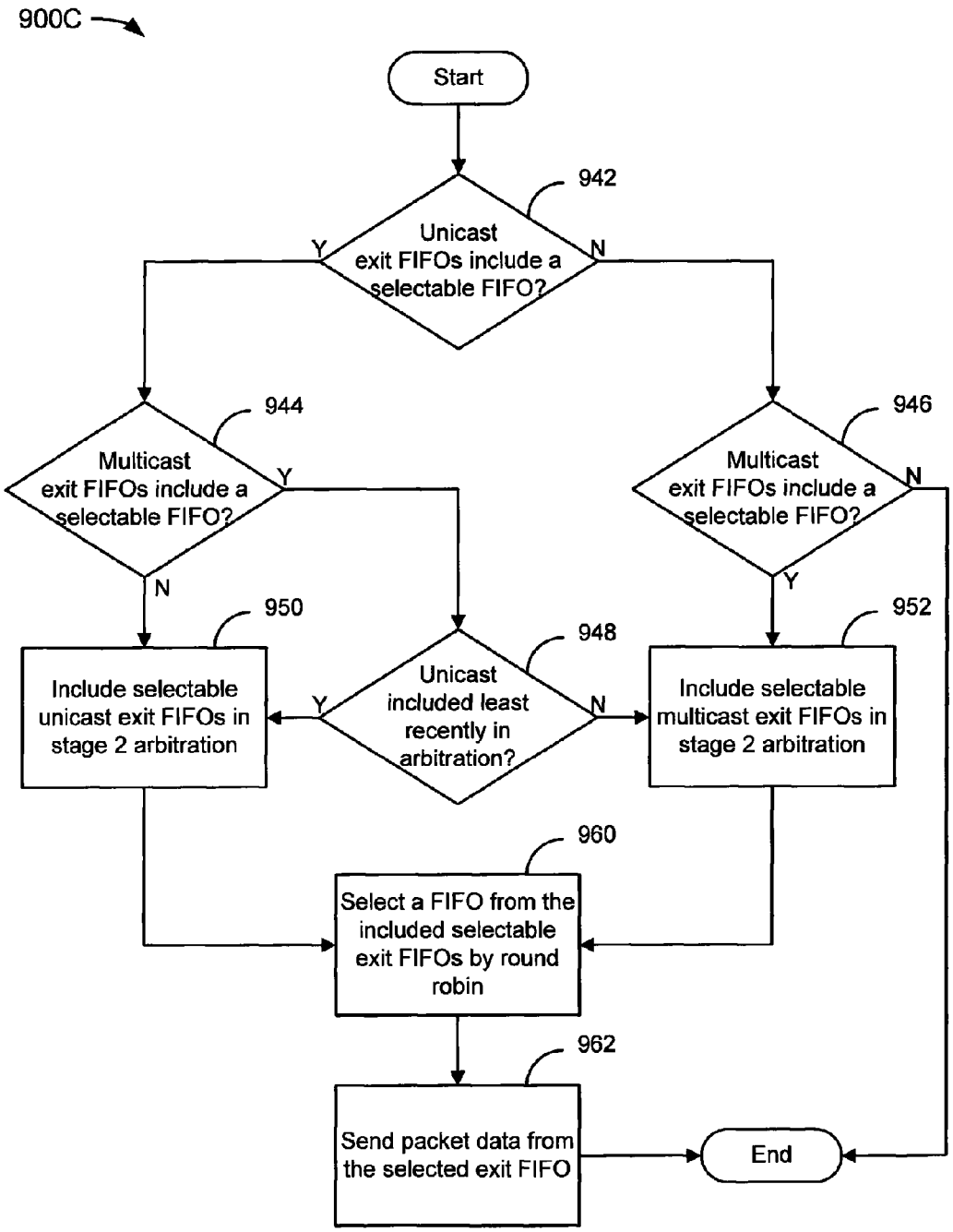

FIG. 9C is a flowchart 900C of a method in accordance with an embodiment of the invention. FIG. 9C is intended to illustrate how an exit FIFO is selected for Stage Two arbitration. The flowchart 900C starts at decision point 942, where it is determined whether unicast exit FIFOs include a selectable exit FIFO. In an embodiment, selectable exit FIFOs are those that have not been excluded from Stage Two arbitration. If so (942-Y), then at decision point 944 it is determined whether multicast exit FIFOs include a selectable exit FIFO. If not (942-N), then at decision point 946 it is determined whether multicast exit FIFOs include a selectable exit FIFO. If the multicast exit FIFOs include a selectable exit FIFO at decision point 944, then at decision point 948 it is determined whether unicast exit FIFOs were included least recently in Stage Two arbitration. Otherwise (944-N), the selectable unicast exit FIFOs are included in Stage Two arbitration at step 950. If at decision point 946 the multicast exit FIFOs include one or more selectable exit FIFOs, then the selectable multicast exit FIFOs are included in Stage Two arbitration. If not (946-N), then no exit FIFOs are selectable and the flowchart 900C ends. If it is determined at decision point 948 that unicast exit FIFOs were included least recently in Stage Two arbitration, then selectable unicast exit FIFOs are included in Stage Two arbitration at step 950. Otherwise (948-N), selectable multicast exit FIFOs are included in Stage Two arbitration. Once either unicast or multicast exit FIFOs have been included, an exit FIFO is selected from among them by round robin at step 956, cell data is sent from the selected exit FIFO at step 958, and the flowchart 900C ends. In other words, the selected exit FIFO wins Stage Two arbitration.

Figure 9D:
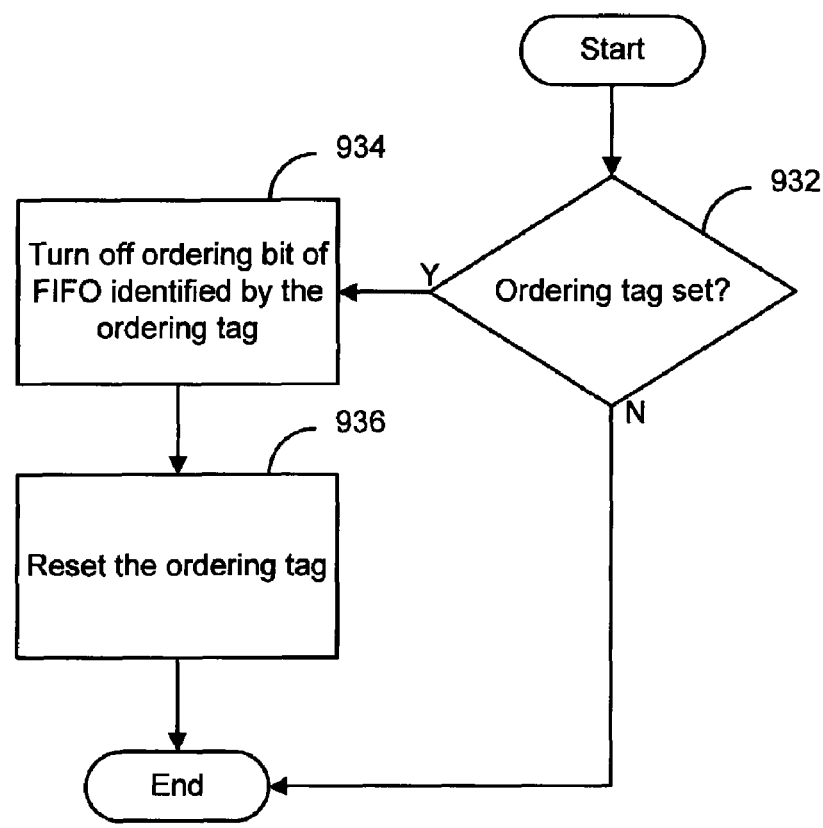

FIG. 9D is a flowchart 900D of a method in accordance with an embodiment of the invention. FIG. 9D is intended to illustrate how the ordering bit and ordering tag are reset after an exit FIFO completes sending its data to the fabric buffers. The flowchart 900D starts at decision point 932, where it is determined whether the ordering tag of the exit FIFO that completed sending its data to the fabric buffers is set. If not, the exit FIFO is the only exit FIFO being used by the ingress queue, and the flowchart 900D ends. Otherwise (932-Y), the ingress queue from which the exit FIFO received cells is using at least one other exit FIFO to forward cells. The at least one other exit FIFO is identified by the ordering tag. The ordering bit of the FIFO identified by the ordering tag is turned off at step 934, the ordering tag is reset at step 936, and the flowchart 900D ends.

In one embodiment, the method steps described above are embodied in a computer-readable media as computer instruction code. It shall be appreciated that not all methods steps described must be performed, nor must they be performed in the order stated.

It should be noted that in an embodiment, packets are broken up into cells for forwarding. Since multiple cells may make up a single packet, an egress queue may have to wait for a cell containing an end-of-packet indicator before reassembling cells into a packet. Since egress queues sometimes reassemble packets from multiple cells, they may be referred to as reassembly queues. As used herein, the term cell is defined broadly to include fixed length cells, variable length cells, and packets.

Although specific embodiments of the invention have been described and illustrated, the invention is not to be limited to the specific forms or arrangements of parts as described and illustrated herein. The invention is limited only by the claims.

What is claimed is:

1. A method of determining how to forward cells from ingress queues to a switch fabric, comprising:
   determining which cells are to be forwarded from ingress queues to exit first-in-first-out queues (FIFOs) in accordance with a priority-biased arbitration stage;

determining which cells are to be forwarded from said exit FIFOs to a switch fabric in accordance with a throughput-biased arbitration stage;

forwarding first cells from an ingress queue of said ingress queues to a first exit FIFO of said exit FIFOs;

forwarding second cells from said ingress queue to a second exit FIFO of said exit FIFOs; and excluding said second exit FIFO from said throughput-biased arbitration until said first cells are sent from said first exit FIFO.

2. The method of claim 1, wherein one of said ingress queues is a multicast ingress queue and one of said exit FIFOs is a multicast exit FIFO, further comprising:

forwarding a cell from a multicast ingress queue of said ingress queues to a multicast exit FIFO of said exit FIFOs; and associating a channel exit port (CEP) designator with said cell in accordance with an exit port table.

3. The method of claim 2, said associating comprising:

turning on one or more bits of a CEP designator in accordance with said exit port table such that said one or more bits identify respective egresses.

4. The method of claim 3, wherein a CEP field to be associated with said cell is smaller than said CEP designator, further comprising:

partitioning said CEP designator into portions with lengths equal to that of a CEP field;

associating a first portion with said cell, wherein said first portion includes a first bit of said one or more bits;

setting an offset such that said first bit and said offset together correspond to a first bit location of said CEP designator;

replicating said cell if a second portion includes a second bit of said one or more bits;

associating said second portion with the replicated cell if said cell was replicated; and setting an offset such that said second bit and said offset together correspond to a second bit location of said CEP designator.

5. The method of claim 4, wherein said CEP designator is 64 bits long, said CEP field is 32 bits long, and said offset is a high/low bit.

6. The method of claim 1, further comprising:

excluding an ingress queue from said priority-biased arbitration stage if a buffer of said switch fabric that corresponds to said ingress queue is unavailable.

7. The method of claim 1, further comprising:

setting an exit FIFO limit;

allowing an ingress queue of said ingress queues to forward cells to plurality of said exit FIFOs; and excluding said ingress queue from said priority-biased arbitration stage if said plurality is at least said exit FIFO limit.

8. The method of claim 7, further comprising:

verifying a first exit FIFO of said plurality includes cells from said ingress queue;

verifying a second exit FIFO of said plurality is available;

setting an ordering bit associated with said second exit FIFO;

setting an ordering tag associated with said first exit FIFO, wherein said ordering tag identifies said second FIFO;

checking said ordering bit; and excluding said second exit FIFO from said throughput-biased arbitration stage if said ordering bit is set.

9. The method of claim 8, further comprising:

identifying said second exit FIFO from said ordering tag;

clearing said ordering bit;

clearing said ordering tag; and forwarding a cell from said first exit FIFO in accordance with said throughput-biased arbitration stage.

10. The method of claim 1, wherein a first subset of said ingress queues includes one or more multicast queues and a second subset of said ingress queues includes one or more unicast queues, further comprising:

setting a probability of selection for each of a plurality of priorities, wherein said pluralities are organized from a lowest priority to a highest priority;

generating a number;

selecting a priority of said plurality of priorities using said number in accordance with the probability of selection for said priority;

excluding from said priority-biased arbitration stage a first subset of said ingress queues if said first subset does not include cells of the selected priority or higher and a second subset of said ingress queues includes cells of said selected priority or higher; and excluding from said priority-biased arbitration stage said second subset of said ingress queues if said second subset does not include cells of said selected priority or higher and said first subset of said ingress queues includes cells of said selected priority or higher, wherein said first subset includes one or more multicast queues and said second subset includes one or more unicast queues.

11. The method of claim 10, wherein said second subset does not include any multicast queues, further comprising:

excluding from said priority-biased arbitration stage said first subset if a queue of said second subset was excluded in a preceding priority-biased arbitration stage.

12. The method of claim 1, further comprising:

setting a probability of selection for each of a plurality of priorities, wherein said pluralities are organized from a lowest priority to a highest priority;

generating a number, wherein said number corresponds to a first priority of said plurality of priorities in accordance with the probability of selection for said first priority;

selecting a second priority if said ingress queues do not include non-empty queues having said first priority;

establishing a third priority that equals said second priority if said ingress queues do not include non-empty queues having said first priority;

establishing said third priority that equals said first priority if said ingress queues include non-empty queues having said first priority;

selecting a non-empty queue having said third priority; and forwarding from said non-empty queue.

13. The method of claim 12, wherein said second priority is selected by round robin and said non-empty queue is selected by round robin.

14. The method of claim 12, further comprising:

reestablishing said third priority at a higher priority if said higher priority is a strict priority, wherein said ingress queues include non-empty queues of said higher priority.

15. The method of claim 1, further comprising:

excluding an exit FIFO of said exit FIFOs from said throughput-biased arbitration if an egress queue associated with said exit FIFO is unavailable.

16. The method of claim 1, further comprising:

excluding an exit FIFO of said exit FIFOs from said throughput-biased arbitration when said exit FIFO targets an egress queue that is targeted by a multicast cell that is already being transmitted, if said exit FIFO is a multicast FIFO.

17. The method of claim 1, further comprising:
checking an ordering field of an exit FIFO of said exit FIFOs, wherein said ordering field indicates another exit FIFO of said exit FIFOs is first in line; and
excluding said exit FIFO from said throughput-biased arbitration stage.

18. The method of claim 1, wherein a first subset of said exit FIFOs includes one or more multicast exit FIFOs and a second subset of said exit FIFOs includes one or more unicast exit FIFOs, further comprising:
excluding a first subset of said exit FIFOs from said throughput-biased arbitration stage if no exit FIFO of said first subset is selectable, wherein said first subset includes one or more multicast exit FIFOs;
excluding a second subset of said exit FIFOs from said throughput-biased arbitration stage if no exit FIFO of said second subset is selectable, wherein said second subset includes one or more unicast exit FIFOs;
excluding said first subset from said throughput-biased arbitration stage if a multicast exit FIFO won a previous throughput-biased arbitration at said throughput-biased arbitration stage, unless said second subset is excluded from said throughput-biased arbitration stage; and
excluding said second subset from said throughput-biased arbitration stage if a unicast exit FIFO won a previous throughput-biased arbitration at said throughput-biased arbitration stage, unless said first subset is excluded from said throughput-biased arbitration stage.

19. The method of claim 1, further comprising:
selecting an exit FIFO for forwarding cells by round robin.

20. The method of claim 1, wherein said cells comprise portions of packets, wherein start-of-packet (SOP) cells and end-of-packet (EOP) cells respectively encapsulate first and last portions of said packets, and wherein said EOP cells include EOP indicators for said packets.

21. The method of claim 20, wherein a subset of said ingress queues are multicast queues, further comprising:
establishing a maximum number of multicast ingress queues that may be active at one time, wherein said multicast ingress queues are a subset of said ingress queues, wherein an active multicast ingress queue has forwarded a first SOP cell, but has not forwarded a first EOP cell that is associated with said first SOP cell, and wherein an inactive multicast ingress queue has forwarded a second EOP cell for every associated second SOP cell;
making said maximum number of multicast ingress queues active by forwarding SOP cells; and
excluding inactive multicast ingress queues from said priority-biased arbitration stage until at least one active queue becomes inactive.

22. A system for performing priority-biased arbitration, comprising:
a plurality of ingress queues;
a priority-biased arbitration engine configured to arbitrate between said plurality of ingress queues;
a plurality of exit first-in-first-out queues (FIFOs) configured to forward cells from said plurality of ingress queues to a switching fabric;
a plurality of ordering fields, respectively associated with said exit FIFOs, configured to contain a value that indicates whether the respective exit FIFOs are not first in line;
an ordering tag, respectively associated with said exit FIFOs, configured to contain a value that identifies a next exit FIFO, wherein said next exit FIFO is next in line; and
a throughput-biased arbitration engine configured to arbitrate between said exit FIFOs, wherein the ordering tag determines an order in which at least two of the exit FIFOs are processed at the throughput-biased arbitration engine to forward the cells from the plurality of exit FIFOs to the switching fabric.

23. The system of claim 22, further comprising:
a plurality of FIFO counters, respectively associated with said ingress queues, configured to contain a value representative of how many exit FIFOs are in use by said respective ingress queues;
a FIFO limit register configured to contain a value representative of a maximum number of FIFOs that said respective ingress queues are permitted to use; and
a comparator, coupled to a FIFO counter of said FIFO counters and said FIFO limit register, configured to exclude an ingress queue of said ingress queues from arbitration by said priority-biased arbitration engine if the FIFO counter associated with said ingress queue contains a value equal to or greater than the value of said FIFO limit register.

24. The system of claim 22, further comprising:
a plurality of probability registers, respectively associated with priorities, configured to contain values that represent probabilities of selecting said respectively associated priorities;
a number generator, coupled to said plurality of probability registers, configured to generate a number indicative of a priority based on said values; and
circuitry configured to exclude a subset of said ingress queues from arbitration by said priority-biased arbitration engine.

25. The system of claim 24, further comprising:
a second plurality of probability registers, respectively associated with said priorities, configured to contain second values that represent probabilities of selecting said respectively associated priorities; and
second circuitry configured to exclude a second subset of said ingress queues from arbitration by said priority-biased arbitration engine using a priority selected using said second plurality of probability registers.

26. A method of determining how to forward cells from ingress queues to a switch fabric, comprising:
determining which cells are to be forwarded from ingress queues to exit first-in-first-out queues (FIFOs) in accordance with a priority-biased arbitration stage, wherein one of said ingress queues is a unicast ingress queue and one of said exit FIFOs is a unicast exit FIFO;
determining which cells are to be forwarded from said exit FIFOs to a switch fabric in accordance with a throughput-biased arbitration stage;
forwarding a cell from a unicast ingress queue of said ingress queues to a unicast exit FIFO of said exit FIFOs;
encoding a CEP designator according to said unicast ingress queue;
decoding said CEP designator into a CEP field and an offset, wherein said CEP field and said offset correspond to said unicast ingress queue and are used to determine the unicast exit FIFO to which the cell is forwarded; and
associating said CEP field and said offset with said cell.

27. The method of claim 26, wherein said decoded CEP designator is 64 bits long, said CEP field is 32 bits long, and said offset is a high/low bit.

* * * * *